United States Patent
Li

(10) Patent No.: US 11,791,708 B2
(45) Date of Patent: Oct. 17, 2023

(54) SWITCH CONTROL CIRCUIT AND POWER CONVERTER COMPRISING THE SAME

(71) Applicant: Monolithic Power Systems, Inc., San Jose, CA (US)

(72) Inventor: Yan-Cun Li, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 154 days.

(21) Appl. No.: 17/541,576

(22) Filed: Dec. 3, 2021

(65) Prior Publication Data

US 2023/0179081 A1    Jun. 8, 2023

(51) Int. Cl.
 *H02M 1/08*     (2006.01)
 *H02M 3/335*    (2006.01)
 *H02M 1/00*     (2006.01)
 *H02M 3/158*    (2006.01)

(52) U.S. Cl.
 CPC ........... *H02M 1/08* (2013.01); *H02M 1/0006* (2021.05); *H02M 3/158* (2013.01); *H02M 3/33576* (2013.01)

(58) Field of Classification Search
 CPC .. H02M 1/0006; H02M 3/158; H02M 3/1588; H02M 3/33576; H02M 3/33592
 See application file for complete search history.

(56) References Cited

U.S. PATENT DOCUMENTS

| | | | | |
|---|---|---|---|---|
| 6,686,729 B1* | 2/2004 | Kawamura | ........... | H02M 3/155 323/282 |
| 8,278,886 B2* | 10/2012 | Megaw | .............. | H03K 17/6871 323/273 |
| 2014/0159680 A1* | 6/2014 | Chiu | .................... | H02M 3/1588 323/271 |
| 2020/0287534 A1* | 9/2020 | Dietrich | .................. | H02M 1/08 |

* cited by examiner

*Primary Examiner* — Kyle J Moody
*Assistant Examiner* — Jye-June Lee
(74) *Attorney, Agent, or Firm* — Perkins Coie LLP

(57) ABSTRACT

A power converter includes a switch control circuit for driving a high side switch of the power converter comprising the high side switch and a low side switch connected in series. The switch control circuit may have a first terminal for receiving a low side switch driving signal of the low side switch, a second terminal used as a reference ground terminal of the switch control circuit, and a third terminal used as an output terminal to provide a high side switch driving signal, the switch control circuit can draw power from the low side switch driving signal and may not require internal regulators that should sustain high voltage.

20 Claims, 5 Drawing Sheets

SWITCH CONTROL CIRCUIT AND POWER CONVERTER COMPRISING THE SAME

TECHNICAL FIELD

The present invention generally relates to electronic circuits, and more particularly but not exclusively, to switch control circuit for driving a power switch and associated power converters comprising the switch control circuit.

BACKGROUND

As shown in the example circuits of FIG. 1 and FIG. 2, conventional gate drivers (e.g. high side gate driver 12 and low side gate driver 13 in FIG. 1) or control ICs (e.g. controller 22 in FIG. 2) for half bridges 11 (in FIG. 1) and 21 (in FIG. 2) need their own power supply circuitries. Both the half bridge 11 in FIG. 1 and the half bridge 21 in FIG. 2 are illustrated to comprise a high side power transistor QH and a low side power transistor QL electrically coupled in series. Typically, especially for driving the high side power transistor QH, a bootstrap circuitry (e.g. comprising bootstrap diode DB and bootstrap capacitor CB) is needed to generate a bootstrap voltage VB and the bootstrap circuitry should be powered by an auxiliary voltage VP conventionally generated by charging a capacitor Caux from an auxiliary winding Laux of the transformer T through a diode Daux. The auxiliary voltage VP or the bootstrap voltage VB generally needs to be regulated to a lower internal supply voltage VDD by internal regulators (e.g. LDO etc.) in the gate drivers (e.g. 12 and 13 in FIG. 1) or control ICs (e.g. 22 in FIG. 2) to supply other internal circuits (such as logic control circuit etc.) in the gate drivers or control ICs. Also, extra pins or circuits (such as synchronization pins SYNC of high side gate driver 12 and low side gate driver 13 and synchronization circuitry inside the high side gate driver 12 in FIG. 1, synchronization circuitry HV SYNC in FIG. 2) are needed to synchronize high-side gate driving signal VGH and low-side gate driving signal VGL which are respectively used to drive the high side power transistor QH and the low side power transistor QL. The internal regulators and synchronization circuitries need to sustain high voltage (e.g. up to 100V or higher) in most AC-DC applications, which increases the design complexity and cost.

SUMMARY

Embodiments of the present invention are directed to a power convert comprising: a high side switch having a first terminal, a second terminal and a control terminal, wherein the first terminal of the high side switch is coupled to an input terminal of the power converter; a low side switch having a first terminal, a second terminal and a control terminal, wherein the first terminal of the low side switch is coupled to the second terminal of the high side switch to form a common connection, and wherein the second terminal of the low side switch is coupled to a reference ground of the power converter; and a high side switch control circuit having a first terminal configured to receive a low side switch driving signal which is provided to the control terminal of the low side switch, a second terminal coupled to the common connection, and a third terminal configured to provide a high side switch driving signal, wherein the high side switch control circuit is configured to draw power from the low side switch driving signal.

In an embodiment, the high side switch control circuit may further be configured to detect whether the low side switch is ON or OFF based on the low side switch driving signal.

Embodiments of the present invention are also directed to a switch control circuit used in the aforementioned power converter. The switch control circuit may comprise: a first terminal, configured to receive a low side switch driving signal of the low side switch; a second terminal, configured as a reference ground terminal of the switch control circuit; a third terminal, configured as an output terminal of the switch control circuit to provide a high side switch driving signal; wherein the switch control circuit is configured to draw power from the low side switch driving signal received at the first terminal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 3:
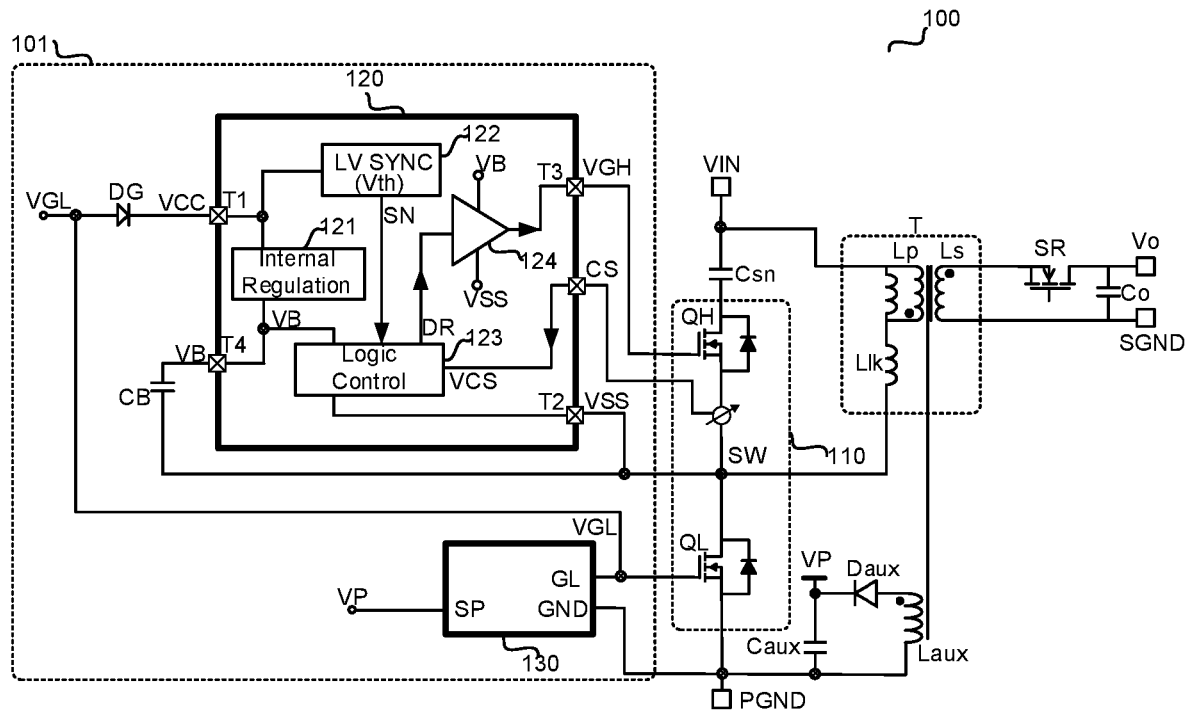
FIG. 3 schematically illustrates a power converter 100 in accordance with an embodiment of the present invention.

FIG. 3 schematically illustrates a power converter 100 in accordance with an embodiment of the present invention. The power converter 100 may include a half bridge switching circuit 110 comprising a high side switch QH and a low side switch QL. The high side switch QH may have a first terminal, a second terminal and a control terminal, wherein the first terminal of the high side switch QH may be coupled to an input terminal VIN of the power converter 100. The low side switch QL may also have a first terminal, a second terminal and a control terminal, wherein the first terminal of the low side switch QL may be coupled to the second terminal of the high side switch QH to form a common connection SW, and wherein the second terminal of the low side switch QL may be coupled to a reference ground (PGND) of the power converter 100.

The power converter 100 may further include a switch driving module 101 configured to drive the half bridge switching circuit 110. The switch driving module 101 may comprise a high side switch control circuit 120 to control the high side switch QH. The high side switch control circuit 120 may comprise a first terminal T1 configured to receive a low side switch driving signal VGL which is used to drive the low side switch QL, a second terminal T2 configured as a reference ground terminal of the high side switch control circuit 120, and a third terminal T3 configured as an output terminal of the high side switch control circuit 120 to provide a high side switch driving signal VGH. The second terminal T2 of the high side switch control circuit 120 may be coupled to the common connection SW. The high side switch driving signal VGH may have a reset logic state (e.g. logic low) to drive the high side switch QH OFF and a set logic state (e.g. logic high) to drive the high side switch QH ON. The high side switch control circuit 120 may be configured to draw power from the low side switch driving signal VGL. Since the low side switch driving signal VGL generally has a well-regulated voltage amplitude for instance in the range of 10V~20V relative to the reference ground potential PGND of the power converter 100, the high side switch control circuit 120 in accordance with various embodiments of the present invention drawing power from the low side switch driving signal VGL may not require internal regulators that should sustain high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. And thus, high voltage tolerant devices are not needed, reducing complexity and cost of switch controller design.

Figure 1:
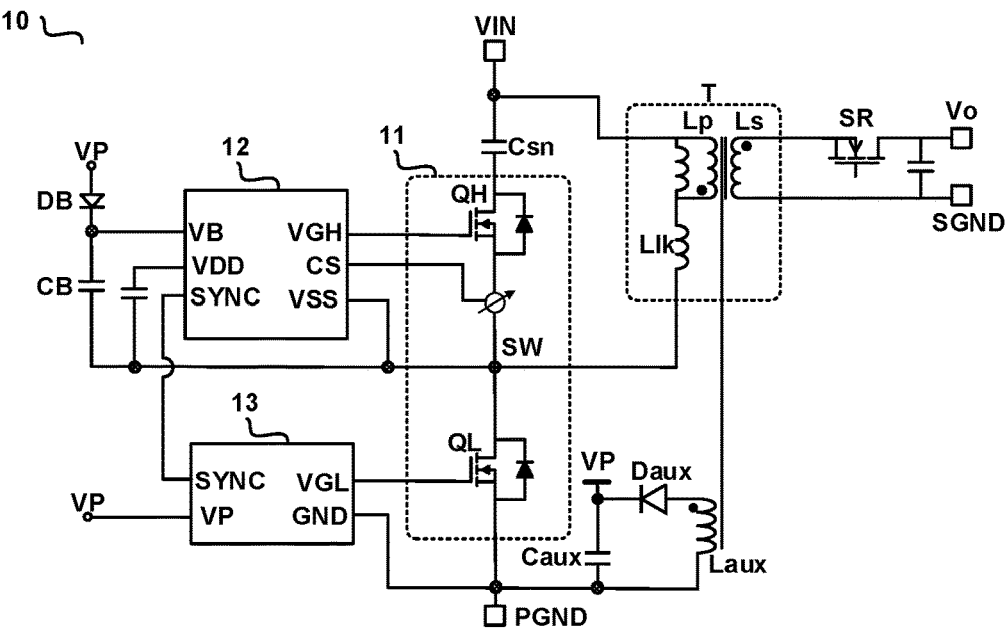
FIG. 1 is a block diagram of a conventional fly-back converter 10.

In accordance with an embodiment of the present invention, the high side switch control circuit 120 may be further configured to implement high side switch control and low side switch control synchronization/communication through the first terminal T1. High side switch control and low side switch control synchronization/communication is essential to prevent the high side switch QH and low side switch QL being ON at the same time. The high side switch control circuit 120 may be configured to detect whether the low side switch is ON or OFF based on the low side switch driving signal VGL received at the first terminal T1. Therefore, the high side switch control circuit 120 according to various embodiments of the present invention can use the single terminal T1 to function as its power supply terminal to draw power as well as its synchronization/communication terminal to realize high side switch control and low side switch control synchronization/communication. In comparison with the conventional gate drivers (e.g. 12 in FIG. 1) needing two separate terminals/pins respectively for power supply and synchronization control, the high side switch control circuit 120 can at least save one I/O terminal/pad when integrated on a semiconductor die or at least save one pin when packaged in an integrated circuit chip. This is cost effective and size saving.

In accordance with an exemplary embodiment of the present invention, the high side switch control circuit 120 may be further configured to determine that it has detected the low side switch QL is ON when the low side switch driving signal VGL is higher than a predetermined threshold Vth relative to a voltage potential VSS at the second terminal T2 of the high side switch control circuit 120. In an exemplary embodiment, the predetermined threshold Vth may be zero volt. In an alternative exemplary embodiment, the predetermined threshold Vth may be a voltage value higher than zero volt (e.g. 0.5V, or 1V or other appropriate values) to improve noise immunity. The high side switch control circuit 120 may be further configured to determine that it has detected the low side switch QL is OFF when the low side switch driving signal VGL is lower than the predetermined threshold Vth relative to the voltage potential VSS at the second terminal T2 of the high side switch control circuit 120. The high side switch control circuit 120 may further be configured to lock/keep the high side switch driving signal VGH at the reset logic state (e.g. logic low) when it has detected the low side switch QL is ON (i.e. when the low side switch driving signal VGL is higher than the predetermined threshold Vth relative to the voltage potential VSS at the second terminal T2) to keep the high side switch QH OFF. The high side switch control circuit 120 may further be configured to enable/allow the high side switch driving signal VGH to switch between the reset logic state (e.g. logic low) and the set logic state (e.g. logic high) when it has detected that the low side switch QL is OFF (i.e. when the low side switch driving signal is lower than the predetermined threshold Vth relative to the voltage potential VSS at the second terminal T2).

In accordance with an exemplary embodiment of the present invention, the high side switch control circuit 120 may further comprise a fourth terminal T4, configured to provide a regulated voltage signal VB when a capacitive energy storage device CB is coupled between the fourth terminal T4 and the second terminal T2 of the high side switch control circuit 120.

Figure 4:
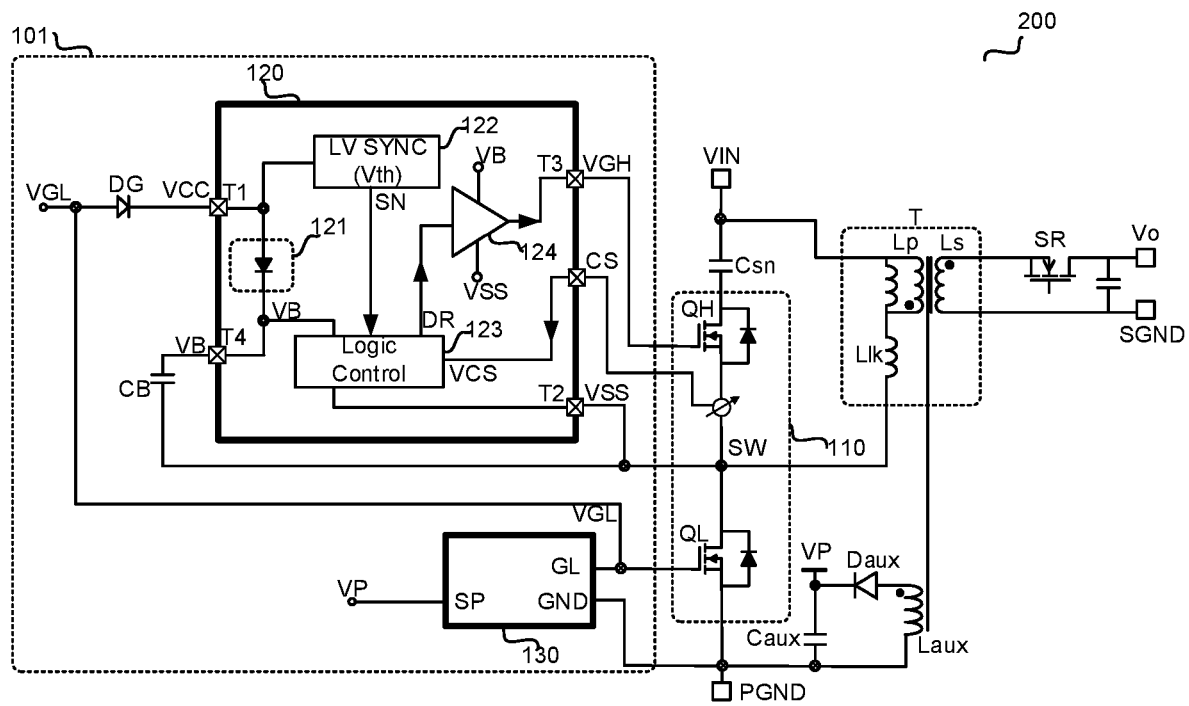
FIG. 4 schematically illustrates a power converter 200 in accordance with an alternative embodiment of the present invention.

In accordance with an exemplary embodiment of the present invention, the high side switch control circuit 120 may further comprise an internal regulation module 121, coupled between the first terminal T1 and the fourth terminal T4 of the high side switch control circuit 120. The internal regulation module 121 may be configured to convert the low side switch driving signal VGL into the regulated voltage signal VB when the capacitive energy storage device CB is coupled between the fourth terminal T4 and the second terminal T2 of the high side switch control circuit 120. Since the voltage amplitude of the low side switch driving signal VGL may generally be in the range of 10V~20V relative to the reference ground potential PGND of the power converter 100, the high side switch control circuit 120 may not require its internal regulation module 121 to be capable of sustaining high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. For instance, the internal regulation module 121 may be comprised of low voltage devices (e.g. having break down voltages lower than the voltage amplitude of the low side switch driving signal VGL). For instance, in the exemplary embodiment illustrated in FIG. 4, the internal regulation module 121 of the power converter 200 may simply comprise a rectifier (e.g. MOSFET or diode) that is configured to be conductive in a direction from the first terminal T1 to the fourth terminal T4 and be reverse blocking (non-conductive) in a direction from the fourth terminal T4 to the first terminal T1. Except the internal regulation module 121, other circuits and elements in the power converter 200 are the same as those in the power converter 100 and will not be addressed again. Low voltage devices are not only cost effective and size saving but also help to reduce design complexity and power dissipation.

In accordance with an exemplary embodiment of the present invention, the high side switch control circuit 120 may further comprise a synchronization control module 122, coupled to the first terminal T1 of the high side switch control circuit 120, and configured to generate a synchronization control signal SN based on the low side switch driving signal VGL, wherein the synchronization control signal SN has a first logic level (e.g. logic high) which indicates that the low side switch QL is ON and a second logic level (e.g. logic low) which indicates that the low side switch QL is OFF. Since the voltage amplitude of the low side switch driving signal VGL may generally be in the range of 10V~20V relative to the reference ground potential PGND of the power converter 100, the high side switch control circuit 120 may not require its synchronization control module 122 to be capable of sustaining high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. For instance, the synchronization control module 122 may be comprised of low voltage devices. Low voltage devices are not only cost effective and size saving but also help to reduce design complexity and power dissipation.

In accordance with an exemplary embodiment of the present invention, the high side switch control circuit 120 may further comprise a logic control module 123 and a driver 124. In an example, the logic control module 123 and the driver 124 may be powered by the regulated voltage signal VB from the internal regulation module 121. The logic control module 123 may be configured to at least receive the synchronization control signal SN and further configured to provide a control signal DR to the driver 124 at least partially based on the synchronization control signal SN. The driver 124 may be configured to enhance the driving capability of the control signal DR to provide the high side switch driving signal VGH. For instance, the logic control module 123 may be configured to set the control signal DR at logic low to lock the high side switch driving signal VGH at the reset logic state (e.g. logic low) so as to keep the first switch OFF when the synchronization control signal SN is at the first logic level (e.g. logic high) which indicates that the low side switch is ON. The logic control module 123 may be further configured to enable/allow the control signal DR to switch between logic high and logic low according to other signals (e.g. a current sense signal VCS indicative of current flowing through the high side switch QH) input to the logic control module 123 and thus enable/allow the high side switch driving signal VGH to switch between the set logic state (e.g. logic high) and the reset logic state (e.g. logic low) so as to enable/allow the high side switch QH to perform ON and OFF switching when the synchronization control signal SN is at the second logic level (e.g. logic low) which indicates that the low side switch is OFF.

In accordance with an exemplary embodiment of the present invention, the switch driving module 101 may further comprise a low side switch control circuit 130 to control the low side switch QL. The low side switch control circuit 130 may have a first terminal SP configured to receive a power supply voltage VP, a second terminal GND connected to the reference ground PGND of the power converter 100, and a third terminal GL configured to provide the low side switch driving signal VGL.

In accordance with an exemplary embodiment of the present invention, the power converter 100 may further comprise an inductive energy storage device T which is illustrated as a transformer having a primary winding Lp and a secondary winding Ls in the example of FIG. 3. The primary winding Lp may be coupled between the input terminal VIN of the power converter 100 and the common connection SW of the high side switch QH and the low side switch QL. The Llk is illustrative to represent a leakage inductance of the transformer T. The secondary winding Ls may have a first terminal coupled to an output terminal Vo of the power converter 100 through a synchronous rectifier SR (e.g. comprising a MOSFET) and a second terminal coupled to a secondary reference ground SGND of the secondary side of the power converter 100. An output capacitive energy storage device Co may be coupled between the output terminal Vo and the secondary reference ground SGND of the power converter 100. In the exemplary embodiment of FIG. 1, the power converter 100 is illustrated to have a flyback converter topology. The power supply voltage VP for supplying the low side switch control circuit 130 may be generated from an auxiliary winding Laux of the transformer T which is inductively coupled to the primary winding Lp and secondary winding Ls of the transformer T. A diode Daux and a capacitor Caux may be coupled between a first terminal and a second terminal of the auxiliary winding Laux and a voltage across the capacitor Caux may be provided as the power supply voltage VP.

In accordance with an exemplary embodiment of the present invention, the first terminal T1 of the high side switch control circuit 120 may be configured to receive the low side switch driving signal VGL through a one direction conductive device DG (e.g. a MOSFET connected as a diode or a diode). The one direction conductive device DG may be conductive in a direction into the first terminal T1 of the high side switch control circuit 120 (e.g. from outside of the high side switch control circuit 120 into the first terminal T1, in the example of FIG. 1 from the third terminal GL of the low side switch control circuit 130 to the first terminal T1) and reverse-blocked (nonconductive) in a direction out of the first terminal T1 of the high side switch control circuit 120 (e.g. from the first terminal T1 to outside of the high side switch control circuit 120, in the example of FIG. 1 from the first terminal T1 of the high side switch control circuit 120 to the third terminal GL of the low side switch control circuit 130). The one direction conductive device DG may have a reverse breakdown voltage higher than a predetermined voltage value, for example the predetermined voltage value may be determined by a maximum voltage difference between the low side switch driving signal VGL and the voltage potential VSS at the second terminal T2 of the high side switch control circuit 120. To provide an example, for a typical application where an input voltage of 380V is provided at the input terminal VIN of the power converter 100 with an output voltage of 20V desired and the turns ratio between the primary winding Lp and the secondary winding Ls is 8, the maximum voltage difference between the low side switch driving signal VGL and the voltage potential VSS at the second terminal T2 of the high side switch control circuit 120 may reach 540V at the moment when the low side switch is turned OFF, thus, it may be reasonable to choose the one direction conductive device DG to have a reverse breakdown voltage higher than 540V for example of 600V or 700V to protect the high side switch control circuit 120 from being damaged.

Figure 5:
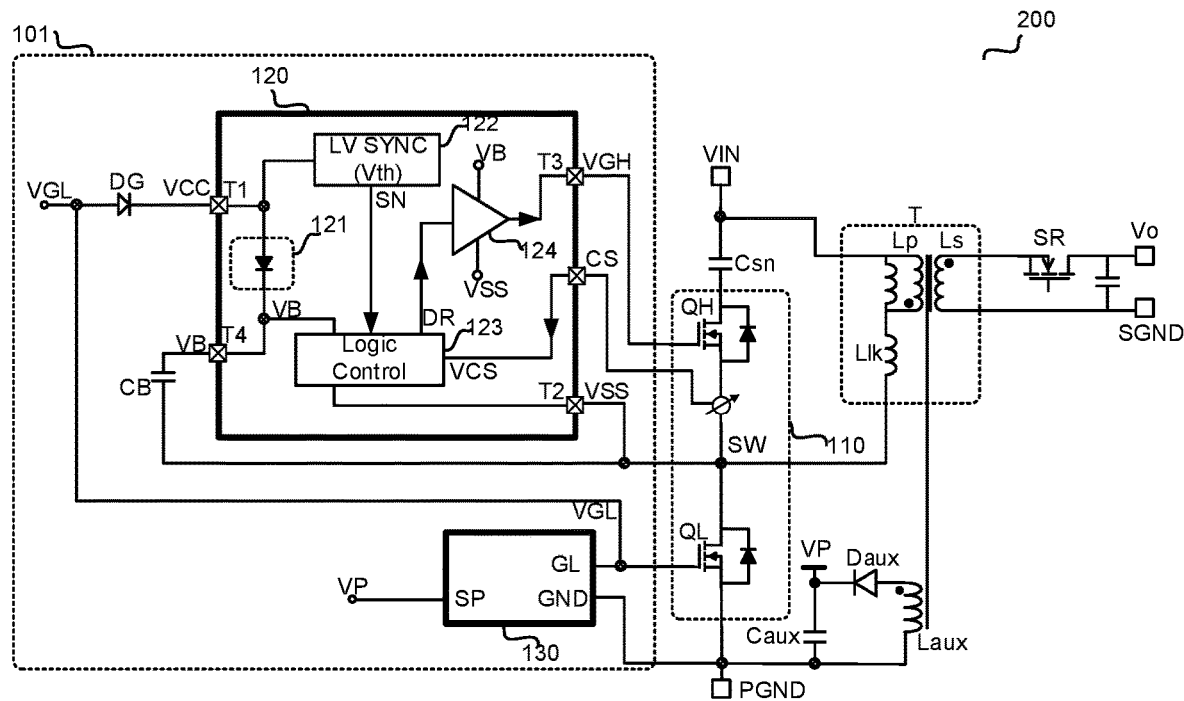
FIG. 5 schematically illustrates a power converter 300 in accordance with an alternative embodiment of the present invention.

In the foregoing embodiments, a power converter (e.g. 100 or 200) configured in flyback converter topology comprising a high side switch control circuit (e.g. 120) for driving a high side switch (e.g. QH) of a half bridge switching circuit (e.g. 110) is taken as an example. One of ordinary skill in the art would understand, however, that the high side switch control circuit according to various embodiments of the present invention is also applicable to other power converters of different topologies. FIG. 5 schematically illustrates a power converter 300 in accordance with an alternative embodiment of the present invention. The power converter 300 may include a half bridge switching circuit 210 comprising a high side switch QH and a low side switch QL. The high side switch QH may have a first terminal, a second terminal and a control terminal, wherein the first terminal of the high side switch QH may be coupled to an input terminal VIN of the power converter 300. The low side switch QL may also have a first terminal, a second terminal and a control terminal, wherein the first terminal of the low side switch QL may be coupled to the second terminal of the high side switch QH to form a common connection SW, and wherein the second terminal of the low side switch QL may be coupled to a reference ground (PGND) or a current sense pin CS of the power converter 300.

The power converter 300 may further include a switch driving module 201 configured to drive the half bridge switching circuit 210. Similar as the switch driving module 101, the switch driving module 201 may comprise a high side switch control circuit 220 to control the high side switch QH. The high side switch control circuit 220 may comprise a first terminal T1 configured to receive a low side switch driving signal VGL which is used to drive the low side switch QL, a second terminal T2 configured as a reference ground terminal of the high side switch control circuit 220, and a third terminal T3 configured as an output terminal of the high side switch control circuit 220 to provide a high side switch driving signal VGH. The second terminal T2 of the high side switch control circuit 220 may be coupled to the common connection SW. The high side switch driving signal VGH may have a reset logic state (e.g. logic low) to drive the high side switch QH OFF and a set logic state (e.g. logic high) to drive the high side switch QH ON. The high side switch control circuit 220 may be configured to draw power from the low side switch driving signal VGL. Since the low side switch driving signal VGL generally has a well-regulated voltage amplitude for instance in the range of 10V~20V relative to the reference ground potential PGND of the power converter 300, the high side switch control circuit 220 in accordance with various embodiments of the present invention drawing power from the low side switch driving signal VGL may not require internal regulators that should sustain high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. And thus, high voltage tolerant devices are not needed, reducing complexity and cost of switch controller design.

Figure 2:
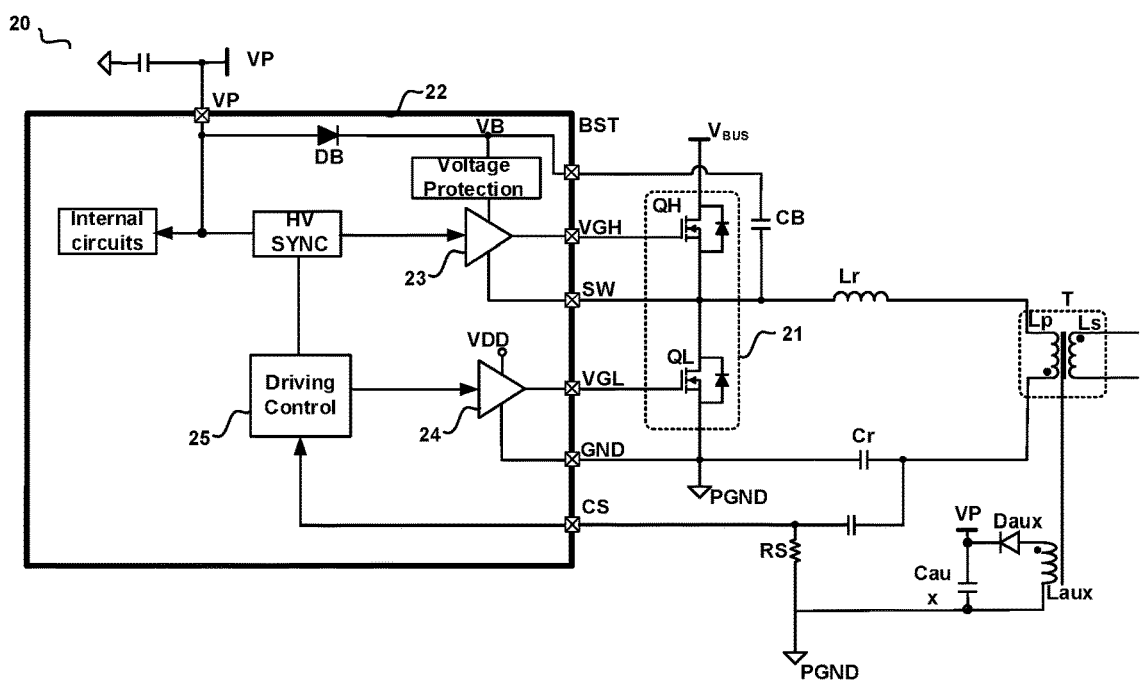
FIG. 2 is a block diagram of a conventional LLC converter 20.

In accordance with an embodiment of the present invention, the high side switch control circuit 220 may be further configured to implement high side switch control and low side switch control synchronization/communication through the first terminal T1. High side switch control and low side switch control synchronization/communication is essential to prevent the high side switch QH and low side switch QL being ON at the same time. The high side switch control circuit 220 may be configured to detect whether the low side switch is ON or OFF based on the low side switch driving signal VGL received at the first terminal T1. Therefore, the high side switch control circuit 220 according to various embodiments of the present invention can use the single terminal T1 to function as its power supply terminal to draw power as well as its synchronization/communication terminal to realize high side switch control and low side switch control synchronization/communication. In comparison with the conventional switch controllers (e.g. 22 in FIG. 2) needing two separate terminals/pins respectively for power supply and synchronization control, the high side switch control circuit 220 can at least save one I/O terminal/pad when integrated on a semiconductor die or at least save one pin when packaged in an integrated circuit chip. This is cost effective and size saving.

In accordance with an exemplary embodiment of the present invention, the high side switch control circuit 220 may be further configured to determine that it has detected the low side switch QL is ON when the low side switch driving signal VGL is higher than a predetermined threshold Vth relative to a voltage potential (also labeled with VSS for brevity) at the second terminal T2 of the high side switch control circuit 220. In an exemplary embodiment, the predetermined threshold Vth may be zero volt. In an alternative exemplary embodiment, the predetermined threshold Vth may be a voltage value higher than zero volt (e.g. 0.5V, or 1V or other appropriate values) to improve noise immunity. The high side switch control circuit 220 may be further configured to determine that it has detected the low side switch QL is OFF when the low side switch driving signal VGL is lower than the predetermined threshold Vth relative to the voltage potential VSS at the second terminal T2 of the high side switch control circuit 220. The high side switch control circuit 220 may further be configured to lock/keep the high side switch driving signal VGH at the reset logic state (e.g. logic low) when it has detected the low side switch QL is ON (i.e. when the low side switch driving signal VGL is higher than the predetermined threshold Vth relative to the voltage potential VSS at the second terminal T2) to keep the high side switch QH OFF. The high side switch control circuit 220 may further be configured to enable/allow the high side switch driving signal VGH to switch between the reset logic state (e.g. logic low) and the set logic state (e.g. logic high) when it has detected that the low side switch QL is OFF (i.e. when the low side switch driving signal is lower than the predetermined threshold Vth relative to the voltage potential VSS at the second terminal T2).

In accordance with an exemplary embodiment of the present invention, the high side switch control circuit 220 may further comprise a fourth terminal T4, configured to provide a regulated voltage signal VB when a capacitive energy storage device CB is coupled between the fourth terminal T4 and the second terminal T2 of the high side switch control circuit 220.

Figure 6:
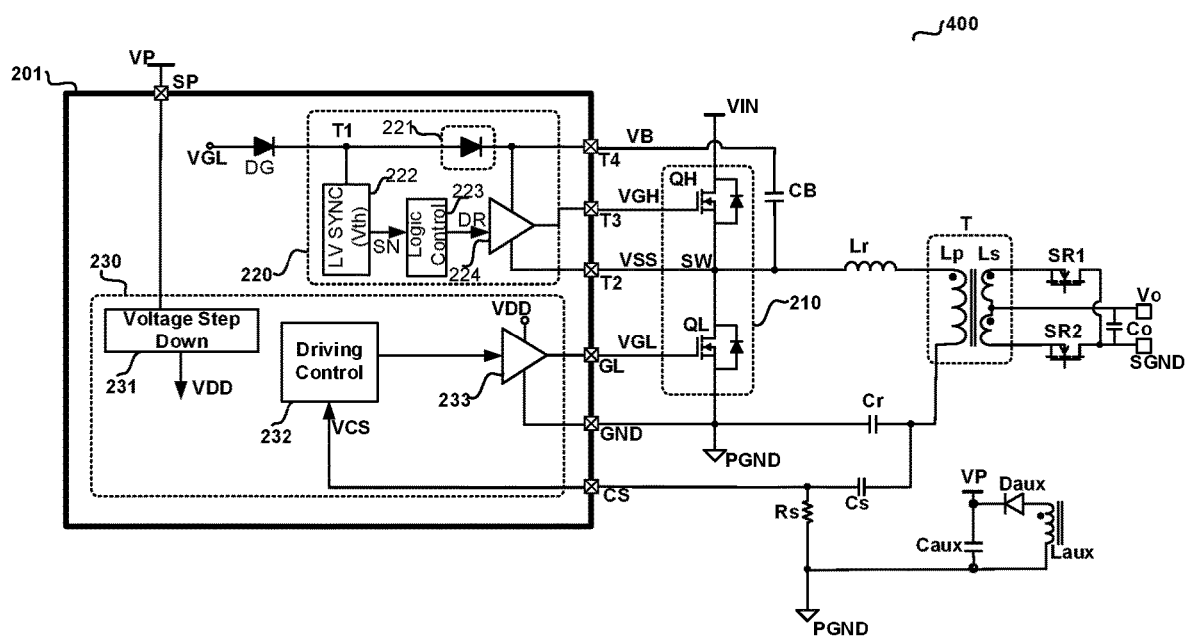
FIG. 6 schematically illustrates a power converter 400 in accordance with an alternative embodiment of the present invention.

In accordance with an exemplary embodiment of the present invention, the high side switch control circuit 220 may further comprise an internal regulation module 221, coupled between the first terminal T1 and the fourth terminal T4 of the high side switch control circuit 220. The internal regulation module 221 may be configured to convert the low side switch driving signal VGL into the regulated voltage signal VB when the capacitive energy storage device CB is coupled between the fourth terminal T4 and the second terminal T2 of the high side switch control circuit 220. Since the voltage amplitude of the low side switch driving signal VGL may generally be in the range of 10V~20V relative to the reference ground potential PGND of the power converter 300, the high side switch control circuit 220 may not require its internal regulation module 221 to be capable of sustaining high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. For instance, the internal regulation module 221 may be comprised of low voltage devices (e.g. having break down voltages lower than the voltage amplitude of the low side switch driving signal VGL). For instance, in the exemplary embodiment illustrated in FIG. 6, the internal regulation module 221 of the power converter 400 may simply comprise a rectifier (e.g. MOSFET or diode) that is configured to be conductive in a direction from the first terminal T1 to the fourth terminal T4 and be reverse blocking (non-conductive) in a direction from the fourth terminal T4 to the first terminal T1. Except the internal regulation module 221, other circuits and elements in the power converter 400 are the same as those in the power converter 300 and will not be addressed again. Low voltage devices are not only cost effective and size saving but also help to reduce design complexity and power dissipation.

In accordance with an exemplary embodiment of the present invention, the high side switch control circuit 220 may further comprise a synchronization control module 222, coupled to the first terminal T1 of the high side switch control circuit 220, and configured to generate a synchronization control signal SN based on the low side switch driving signal VGL, wherein the synchronization control signal SN has a first logic level (e.g. logic high) which indicates that the low side switch QL is ON and a second logic level (e.g. logic low) which indicates that the low side switch QL is OFF. Since the voltage amplitude of the low side switch driving signal VGL may generally be in the range of 10V~20V relative to the reference ground potential PGND of the power converter 300, the high side switch control circuit 220 may not require its synchronization control module 222 to be capable of sustaining high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. For instance, the synchronization control module 222 may be comprised of low voltage devices. Low voltage devices are not only cost effective and size saving but also help to reduce design complexity and power dissipation.

In accordance with an exemplary embodiment of the present invention, the high side switch control circuit 220 may further comprise a logic control module 223 and a driver 224. In an example, the logic control module 223 and the driver 224 may be powered by the regulated voltage signal VB from the internal regulation module 221. The logic control module 223 may be configured to at least receive the synchronization control signal SN and further configured to provide a control signal DR to the driver 224 at least partially based on the synchronization control signal SN. The driver 224 may be configured to enhance the driving capability of the control signal DR to provide the high side switch driving signal VGH. For instance, the logic control module 223 may be configured to set the control signal DR at logic low to lock the high side switch driving signal VGH at the reset logic state (e.g. logic low) so as to keep the first switch OFF when the synchronization control signal SN is at the first logic level (e.g. logic high) which indicates that the low side switch is ON. The logic control module 223 may be further configured to enable/allow the control signal DR to switch between logic high and logic low according to other signals input to the logic control module 223 and thus enable/allow the high side switch driving signal VGH to switch between the set logic state (e.g. logic high) and the reset logic state (e.g. logic low) so as to enable/allow the high side switch QH to perform ON and OFF switching when the synchronization control signal SN is at the second logic level (e.g. logic low) which indicates that the low side switch is OFF.

In accordance with an exemplary embodiment of the present invention, the switch driving module 201 may further comprise a low side switch control circuit 230 to control the low side switch QL. The low side switch control circuit 230 may have a first terminal SP configured to receive a power supply voltage VP, a second terminal GND connected to the reference ground PGND of the power converter 300, and a third terminal GL configured to provide the low side switch driving signal VGL. In the example shown in FIG. 5, the low side switch control circuit 230 is illustrated to comprise a voltage step down circuit 231 configured to convert the power supply voltage VP to a lower internal supply voltage VDD. The low side switch control circuit 230 may further comprise a driving control circuit 232 and a driver 233 for generating the low side switch driving signal QL. The driving control circuit 232 and driver 233 may be powered with the internal supply voltage VDD.

In accordance with an exemplary embodiment of the present invention, the power converter 300 may further comprise an inductive energy storage device T which is illustrated as a transformer having a primary winding Lp, a first secondary winding Ls1 and a second secondary winding Ls2 in the example of FIG. 5. The primary winding Lp may have a first terminal coupled to the common connection SW of the high side switch QH and the low side switch QL through a resonant inductor Lr, and a second terminal coupled to the reference ground PGND of the power converter 300 through a resonant capacitor Cr. A current sensing capacitor Cs and a current sensing resistor Rs may be coupled to the primary winding Lp to provide a current sense signal VCS to the driving control circuit 232 of the low side switch control circuit 230. The first secondary winding Ls1 may have a first terminal coupled to a secondary reference ground SGND of the secondary side of the power converter 300, and a second terminal coupled to an output terminal Vo of the power converter 300 through a first synchronous rectifier SR1 (e.g. comprising a MOSFET). The second secondary winding Ls2 may have a first terminal coupled to the output terminal Vo of the power converter 300, and a second terminal coupled to the secondary reference ground SGND of the secondary side of the power converter 300 through a second synchronous rectifier SR2 (e.g. comprising a MOSFET). An output capacitive energy storage device Co may be coupled between the output terminal Vo and the secondary reference ground SGND of the power converter 300. In the exemplary embodiment of FIG. 5, the power converter 300 is illustrated to have a LLC converter topology. The power supply voltage VP for supplying the low side switch control circuit 230 may be generated from an auxiliary winding Laux of the transformer T which is inductively coupled to the primary winding Lp and first and second secondary windings Ls1 and Ls2 of the transformer T. A diode Daux and a capacitor Caux may be coupled between a first terminal and a second terminal of the auxiliary winding Laux and a voltage across the capacitor Caux may be provided as the power supply voltage VP.

In accordance with an exemplary embodiment of the present invention, the first terminal T1 of the high side switch control circuit 220 may be configured to receive the low side switch driving signal VGL through a one direction conductive device DG (e.g. a MOSFET connected as a diode or a diode). The one direction conductive device DG may be conductive in a direction into the first terminal T1 of the high side switch control circuit 220 (e.g. from outside of the high side switch control circuit 220 into the first terminal T1, in the example of FIG. 5 from the third terminal GL of the low side switch control circuit 230 to the first terminal T1) and reverse-blocked (nonconductive) in a direction out of the first terminal T1 of the high side switch control circuit 220 (e.g. from the first terminal T1 to outside of the high side switch control circuit 220, in the example of FIG. 5 from the first terminal T1 of the high side switch control circuit 220 to the third terminal GL of the low side switch control circuit 230). The one direction conductive device DG may have a reverse breakdown voltage higher than a predetermined voltage value, for example the predetermined voltage value may be determined by a maximum voltage difference between the low side switch driving signal VGL and the voltage potential VSS at the second terminal T2 of the high side switch control circuit 220. To provide an example, for a typical application where an input voltage of 380V is provided at the input terminal VIN of the power converter 300 with an output voltage of 20V desired and the turns ratio between the primary winding Lp and the first secondary winding Ls1 is 4, the maximum voltage difference between the low side switch driving signal VGL and the voltage potential VSS at the second terminal T2 of the high side switch control circuit 120 may reach 540V at the moment when the low side switch is turned OFF, thus, it may be reasonable to choose the one direction conductive device DG to have a reverse breakdown voltage higher than 540V for example of 600V or 700V to protect the high side switch control circuit 220 from being damaged.

The advantages of the various embodiments of the present invention are not confined to those described above. These and other advantages of the various embodiments of the present invention will become more apparent upon reading the whole detailed descriptions and studying the various figures of the drawings.

Figure 7:
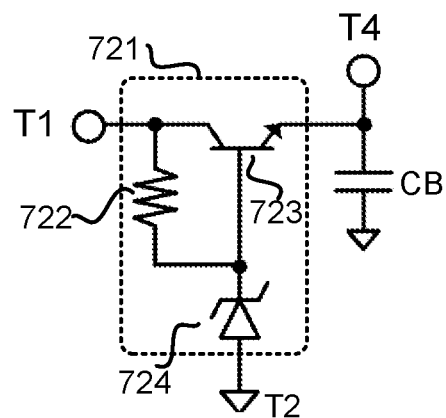
FIG. 7 schematically illustrates an internal regulation module 721 in accordance with an embodiment of the present invention.

Obviously many modifications and variations of the present invention are possible in light of the above teachings. It is therefore to be understood that within the scope of the appended claims the invention may be practiced otherwise than as specifically described. For example, FIG. 7 schematically illustrates an internal regulation module 721 in accordance with an embodiment of the present invention that may be used as the internal regulation module 121 of the high side switch control circuit 120 or as the internal regulation module 221 of the high side switch control circuit 220. The internal regulation module 721 may comprise a resistor 722, a bipolar transistor 723 and a Zener diode 724. The resistor 722 has a first terminal coupled to the first terminal T1 of the high side switch control circuit 120 when used as the internal regulation module 121 (or coupled to the first terminal T1 of the high side switch control circuit 220 when used as the internal regulation module 221) and a second terminal coupled to a cathode of the Zener diode 724. The bipolar transistor 723 has a first terminal coupled to the first terminal T1, a second terminal coupled to the fourth terminal T4 of the high side switch control circuit 120 when used as the internal regulation module 121 (or coupled to the fourth terminal T4 of the high side switch control circuit 220 when used as the internal regulation module 221), and a third terminal coupled to the cathode of the Zener diode 724. An anode of the Zener diode is coupled to the second terminal T2 of the high side switch control circuit 120 when used as the internal regulation module 121 (or coupled to the second terminal T2 of the high side switch control circuit 220 when used as the internal regulation module 221).

Figure 8:
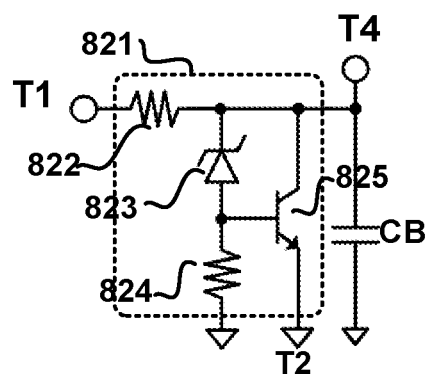
FIG. 8 schematically illustrates an internal regulation module 821 in accordance with an alternative embodiment of the present invention.

For another example, FIG. 8 schematically illustrates an internal regulation module 821 in accordance with an alternative embodiment of the present invention that may be used as the internal regulation module 121 of the high side switch control circuit 120 or as the internal regulation module 221 of the high side switch control circuit 220. The internal regulation module 821 may comprise a first resistor 822, a Zener diode 823, a second resistor 824 and a bipolar transistor 825. The first resistor 822 may be coupled between the first terminal T1 and the fourth terminal T4 of the high side switch control circuit 120 when used as the internal regulation module 121 (or coupled to the fourth terminal T4 of the high side switch control circuit 220 when used as the internal regulation module 221). The Zener diode 823 may have a cathode coupled to the fourth terminal T4 of the high side switch control circuit 120 when used as the internal regulation module 121 (or coupled to the fourth terminal T4 of the high side switch control circuit 220 when used as the internal regulation module 221) and an anode coupled to a first terminal of the second transistor 824. A second terminal of the second transistor 824 is coupled to the second terminal T2 of the high side switch control circuit 120 when used as the internal regulation module 121 (or coupled to the second terminal T2 of the high side switch control circuit 220 when used as the internal regulation module 221). A first terminal of the bipolar transistor 825 is coupled to the fourth terminal T4 of the high side switch control circuit 120 when used as the internal regulation module 121 (or coupled to the fourth terminal T4 of the high side switch control circuit 220 when used as the internal regulation module 221), a second terminal of the bipolar transistor 825 is coupled to the second terminal T2 of the high side switch control circuit 120 when used as the internal regulation module 121 (or coupled to the second terminal T2 of the high side switch control circuit 220 when used as the internal regulation module 221) and a third terminal of the bipolar transistor 825 is coupled to the anode of the Zener diode 823. The circuit elements in the exemplary internal regulation modules 721 and 821 are low voltage devices (e.g. having breakdown voltages lower than the voltage amplitude of the low side switch driving signal VGL).

Figure 9:
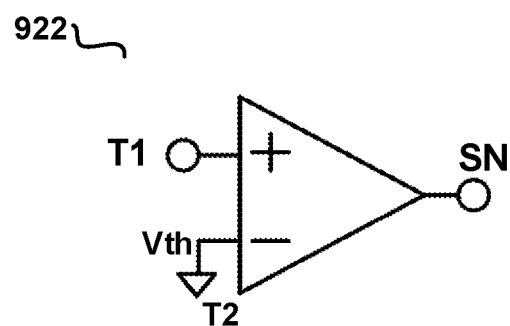
FIG. 9 schematically illustrates a synchronization control module 922 in accordance with an embodiment of the present invention.

FIG. 9 schematically illustrates a synchronization control module 922 in accordance with an embodiment of the present invention that may be used as the synchronization control module 122 of the high side switch control circuit 120 or as the synchronization control module 222 of the high side switch control circuit 220. In this example, the synchronization control module 922 may comprise a comparator having a first input terminal (e.g. the non-inverting input terminal "+") coupled to the first terminal T1 of the high side switch control circuit 120 when used as the synchronization control module 122 (or coupled to the first terminal T1 of the high side switch control circuit 220 when used as the synchronization control module 222), a second input terminal (e.g. the inverting input terminal "−") configured to receive the predetermined threshold Vth (e.g. in the example of FIG. 9, the second input terminal of the comparator is connected to the second terminal T2 of the high side switch control circuit 120 or 220 and thus the predetermined threshold Vth is zero volt relative to the voltage potential VSS), the comparator is configured to compare the low side switch driving signal VGL received at the first terminal T1 with the predetermined threshold Vth to provide the synchronization control signal SN at output terminal of the comparator. The comparator can be comprised of low voltage devices.

Figure 10:
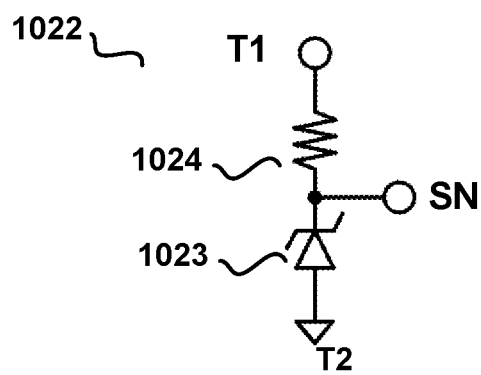
FIG. 10 schematically illustrates a synchronization control module 1022 in accordance with an alternative embodiment of the present invention.

FIG. 10 schematically illustrates a synchronization control module 1022 in accordance with an alternative embodiment of the present invention that may be used as the synchronization control module 122 of the high side switch control circuit 120 or as the synchronization control module 222 of the high side switch control circuit 220. The synchronization control module 1022 may comprise a Zener diode 1023, having a cathode coupled to the first terminal T1 of the high side switch control circuit 120 when used as the synchronization control module 122 (or coupled to the first terminal T1 of the high side switch control circuit 220 when used as the synchronization control module 222) through a resistive element 1024 and an anode connected to the second terminal T2 of the high side switch control circuit 120 when used as the synchronization control module 122 (or coupled to the second terminal T2 of the high side switch control circuit 220 when used as the synchronization control module 222), and may be configured to provide the synchronization signal SN at the cathode of the Zener diode 1023. The synchronization control module 1022 are also comprised of low voltage elements having breakdown voltages lower than the voltage amplitude of the low side switch driving signal VGL.

It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A power converter comprising:
   a high side switch having a first terminal, a second terminal and a control terminal, wherein the first terminal of the high side switch is coupled to an input terminal of the power converter;
   a low side switch having a first terminal, a second terminal and a control terminal, wherein the first terminal of the low side switch is coupled to the second terminal of the high side switch to form a common connection, and wherein the second terminal of the low side switch is coupled to a reference ground of the power converter; and
   a high side switch control circuit having a first terminal configured to receive a low side switch driving signal which is provided to the control terminal of the low side switch, a second terminal coupled to the common connection, and a third terminal configured to provide a high side switch driving signal, wherein the high side switch control circuit is configured to draw power from the low side switch driving signal.

2. The power converter of claim 1, wherein the high side switch control circuit is further configured to detect whether the low side switch is ON or OFF based on the low side switch driving signal.

3. The power converter of claim 2, wherein the high side switch control circuit is further configured to determine that it has detected the low side switch is ON when the low side switch driving signal is higher than a predetermined threshold relative to a voltage potential at the second terminal of the high side switch control circuit.

4. The power converter of claim 3, wherein when the low side switch driving signal is lower than the predetermined threshold relative to the voltage potential at the second terminal of the high side switch control circuit, the high side switch control circuit is further configured to determine that it has detected that the low side switch is OFF.

5. The power converter of claim 2, wherein the high side switch control circuit is further configured to keep the high side switch OFF once it has detected that the low side switch is ON.

6. The power converter of claim 2, wherein the high side switch control circuit is further configured to enable/allow the high side switch to perform ON and OFF switching once it has detected that the low side switch is OFF.

7. The power converter of claim 2, wherein the high side switch control circuit further comprises:
   a synchronization control module, coupled to the first terminal of the high side switch control circuit, and configured to generate a synchronization control signal based on the low side switch driving signal, wherein the synchronization control signal has a first logic level which indicates that the low side switch is ON and a second logic level which indicates that the low side switch is OFF.

8. The power converter of claim 7, wherein the synchronization control module comprises:
   a comparison circuit, configured to compare the low side switch driving signal with a predetermined threshold to generate the synchronization control signal, wherein when the low side switch driving signal is higher than the predetermined threshold, the synchronization control signal has the first logic level, and wherein when the low side switch driving signal is lower than the predetermined threshold, the synchronization signal has the second logic level.

9. The power converter of claim 7, wherein the synchronization control module comprises:
a Zener diode, having a cathode coupled to the first terminal of the high side switch control circuit through a resistive element and an anode connected to the second terminal of the high side switch control circuit and configured to provide the synchronization signal at the cathode.

10. The power converter of claim 1 further comprising:
a low side switch control circuit, configured to provide the low side switch driving signal.

11. The power converter of claim 10, wherein the low side switch control circuit has a first terminal configured to receive a power supply voltage, a second terminal connected to the reference ground of the power converter, and a third terminal configured to provide the low side switch driving signal.

12. The power converter of claim 1, wherein the high side switch control circuit is integrated on a first semiconductor die or packaged in a first integrated circuit chip.

13. The power converter of claim 1, wherein the high side switch control circuit further comprises:
a fourth terminal, configured to provide a regulated voltage signal when a capacitive energy storage device is coupled between the fourth terminal and the second terminal of the high side switch control circuit.

14. The power converter of claim 13, wherein the high side switch control circuit further comprises:
an internal regulation module, coupled between the first terminal of the high side switch control circuit and the fourth terminal of the high side switch control circuit, and configured to convert the low side switch driving signal into the regulated voltage signal when the capacitive energy storage device is coupled between the fourth terminal and the second terminal of the high side switch control circuit.

15. The power converter of claim 1, wherein the first terminal of the high side switch control circuit is further configured to receive the low side switch driving signal through a one direction conductive device.

16. The power converter of claim 15, wherein the one direction conductive device has a reverse breakdown voltage higher than a predetermined voltage value.

17. A switch control circuit for driving a high side switch in a power converter comprising the high side switch and a low side switch connected in series, the switch control circuit comprising:
a first terminal, configured to receive a low side switch driving signal of the low side switch;
a second terminal, configured as a reference ground terminal of the switch control circuit; and
a third terminal, configured as an output terminal of the switch control circuit to provide a high side switch driving signal; wherein
the switch control circuit is configured to draw power from the low side switch driving signal received at the first terminal.

18. The switch control circuit of claim 17, being further configured to lock/keep the high side switch driving signal at a reset logic state when the low side switch driving signal is higher than a predetermined threshold relative to a voltage potential at the second terminal, and further configured to allow the high side switch driving signal to switch between the reset logic state and a set logic state when the low side switch driving signal is lower than the predetermined threshold relative to the voltage potential at the second terminal.

19. The switch control circuit of claim 17, wherein the switch control circuit is integrated on a semiconductor die or packaged in an integrated circuit chip.

20. The switch control circuit of claim 17, further comprising:
a fourth terminal, configured to provide a regulated voltage signal when a capacitive energy storage device is coupled between the fourth terminal and the second terminal of the switch control circuit.

* * * * *